(12) United States Patent
Scapa et al.

(10) Patent No.: US 8,534,651 B2
(45) Date of Patent: Sep. 17, 2013

(54) HOLE-FILLING THREE-PRONG TEMPORARY FASTENER

(75) Inventors: Ino Scapa, Wichita, KS (US); Thomas H. Lomas, Wofford Heights, CA (US)

(73) Assignee: The Boeing Company, Chicago, IL (US)

( * ) Notice: Subject to any disclaimer, the term of this patent is extended or adjusted under 35 U.S.C. 154(b) by 1614 days.

(21) Appl. No.: 11/049,341

(22) Filed: Feb. 2, 2005

(65) Prior Publication Data

US 2006/0170142 A1   Aug. 3, 2006

(51) Int. Cl.
 *B25B 5/06* (2006.01)
(52) U.S. Cl.
 USPC ........... 269/49; 29/270; 29/271; 269/3; 269/6
(58) Field of Classification Search
 USPC ................. 269/49, 48.1, 48.2, 48.3, 48.4, 47, 269/6, 3, 95; 29/263, 525.1, 525.2, 720, 29/721, 270, 272; 7/164
 See application file for complete search history.

(56) References Cited

U.S. PATENT DOCUMENTS

| | | | | |
|---|---|---|---|---|
| 2,340,926 A | * | 2/1944 | Bradley | ...................... 285/124.5 |
| 3,426,399 A | | 10/1966 | Jones | |
| 4,596,328 A | * | 6/1986 | Solheim | ...................... 206/315.6 |
| 4,892,449 A | * | 1/1990 | Croxton | ....................... 269/48.3 |
| 4,934,885 A | | 6/1990 | Woods et al. | |
| 4,936,726 A | | 6/1990 | Medard | |
| 5,408,732 A | * | 4/1995 | Anfuso | ........................... 29/263 |

OTHER PUBLICATIONS

Bud Connolly, "Cleco Fastener Tool", www.challengers101.com/ClecoTool.html , pp. 1 and 2.
Cleco/KwikLok Temporary Fastenersm www.lowbucktools.com/clecos.html, pp. 1 and 2 and www.lowbucktools.com/clecoimg.html.

\* cited by examiner

*Primary Examiner* — Lee D Wilson
(74) *Attorney, Agent, or Firm* — Yee & Associates, P.C.

(57) ABSTRACT

A temporary attachment device for securing a number of parts or sheets together has an elongated hollow body with three, slidable and spreadable prongs spaced apart 120°, protruding from an open end of the elongated body over a substantially Y-shaped spreader held in the elongated body and extending through the open end to more evenly and accurately maintain the spacing between and spread the three prongs. The three prongs and spreader more accurately fill pilot holes, after insertion into the openings and the prongs have outwardly facing heads, lobes or noses to more securely clamp at least two sheets of material together. The device may include an internal spring and a movable plunger to allow the prongs to be operated by the pliers, or may include a threaded shaft and a nut secured to the shaft to allow operation of the device by turning the nut and the shaft to slidably move the three prongs.

8 Claims, 5 Drawing Sheets

HOLE-FILLING THREE-PRONG TEMPORARY FASTENER

BACKGROUND OF THE INVENTION

1. Field of the Invention

This invention generally relates to fasteners, and more particularly, to an improved hole-filling three-prong temporary fastener for more precisely and securely temporarily holding two or more parts, such as sheet materials, together.

2. Description of the Prior Art

It is well known to use fasteners to temporarily hold and clamp parts together while other operations are performed on the parts. For example, temporary fasteners are used in the aerospace industry to temporarily attach sheets forming the skin of an aircraft to each other, a flange and/or an airframe. Furthermore, such temporary fasteners may be used to hold sheet metal parts together in many other industries. Since it is expensive and time consuming to temporarily fasten parts together using conventional mechanical devices, such as nuts and bolts, rivets and the like, a number of temporary fasteners, including spring loaded devices operated by mechanical tools have been developed.

Known temporary fasteners, particularly those used in the aerospace industry, are only accessible from one side of the parts to be fastened together. Such temporary fasteners may include those referred to as Cleco fasteners, which are plier-operated spring-loaded fasteners for smaller holes or openings having 2 laterally spreadable clamping pins mounted in a cylindrical body for reciprocal movement through an opening in an end past a stationary pin mounted between the clamping pins. The pliers engage a flange on the fastener body and the rearward projecting end of the fastener to compress an internal spring to advance the clamping pins into openings, the pressure is then released and the clamping pins will retract while expanding over the stationary pin so that clamping pins temporarily hold parts together.

Other types of temporary fasteners for larger openings may include so-called wedge locks or Quad-Locks that include threaded actuators and contain 4 laterally spreadable clamping pins. Examples of temporary fasteners for larger openings are also shown in U.S. Pat. No. 3,426,399 to Jones and U.S. Pat. No. 4,934,885 to Woods et al. The Cleco fasteners and the fasteners set forth in these patents are useful in many situations, but do not act to properly fill and/or align pilot holes (also referred to as "coordinated holes", "digital preassembly holes" or "mating holes") drilled or otherwise formed in mating parts that require accurate and precise alignment during assembly.

Furthermore, known temporary fasteners tend to vibrate out of position during drilling and/or other mechanical processes performed on parts temporarily held together. Therefore, there exists a need in the art for temporary fastening devices that are easy to use and which more accurately and securely holds parts together during fastening processes, including automated processes.

SUMMARY OF THE INVENTION

Accordingly, it is a general object of the present invention to provide an improved temporary fastening device. It is a particular object of the present invention to provide an improved temporary device having three prongs slidable with respect to a central spreader to more accurately align the temporary fastener in openings in parts to be secured together. It is a further particular object of the present invention to provide an improved temporary fastener having three laterally spreadable spring loaded prongs having enlarged heads mounted in a cylindrical body and extending through an opening in an end around a central spreader, which prongs are plier-operated and guided by the central spreader, mounted between the prongs and extending through a lower opening in the temporary fastener, to more precisely and securely hold sheets together. It is a yet another particular object of the present invention to provide an improved temporary fastening device having three laterally spreadable prongs mounted in a cylindrical body and extending through an opening in a lower end around a central spreader element, a threaded portion having a turning portion thereon is connected to inner ends of the prongs to move the prongs into and out of the body over the central spider element to more accurately fill pilot openings in sheet materials to be held together and to more firmly secure the sheets together.

In accordance with one aspect of the present invention, there is provided a temporary fastening device having an elongated hollow body with three, evenly-spaced apart slidable and spreadable prongs movable through an open end of the elongated body over a Y-shaped spreader held in the elongated body and extending through the open end to more evenly and accurately spread the three prongs to fill pilot hole openings and secure sheet materials together. Each of the three prongs preferably includes an outwardly facing head, lobe or nose to more securely clamp at least two sheets of material together.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein like reference numerals are used throughout the several views, and, in which:

DESCRIPTION OF THE PREFERRED EMBODIMENTS

Figure 1:
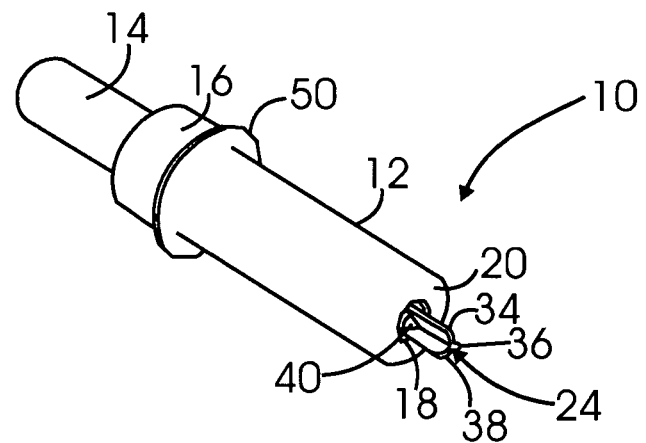
FIG. 1 is a perspective view of a first embodiment of a temporary fastener of the present invention.
Figure 2:
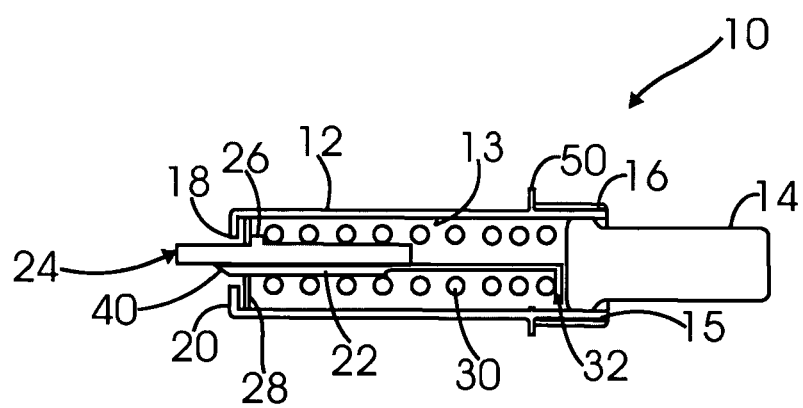
FIG. 2 is partial cross-sectional view of the fastener of FIG. 1.

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide for an improved temporary fastener or attachment device to be used in precisely aligning and temporarily securing sheet metal or other sheet materials together, for example, to perform other operations thereon. The temporary fasteners of the present invention are useable in any size hole, but are particularly useful in aircraft assembly for insertion into smaller holes, defined as being from about ⅛" to about ⅜" and preferably from about ⅛" to about ³⁄₁₆", such as coordinated holes, digital preassembly holes or mating holes formed in 2 or more aircraft parts to be assembled together.

A first embodiment of a temporary attachment or fastener device of the present invention for use in smaller holes is shown at 10 in FIGS. 1-7 of the drawings. The device 10 is selectively placed in mating holes or openings formed in parts or sheets of material to be temporarily secured together.

The device 10 includes an elongated body 12 having an inner chamber 13 with an actuating or operating element 14, such as a plunger, held in a first or upper open end 15 by a cap 16 and an opening 18 formed in a second or lower closed end 20. Three prongs 22 are slidably held in the inner chamber 13 and are evenly spaced around and guided by a central spreader or spider element 24. The prongs 22 are preferably curved or otherwise "spring loaded" so that when they exit the opening 18 a spring action provides outward pressure to bow or force the bodies of the prongs outwardly, a predetermined distance, determined by the size of the pilot hold, the prongs and spreader are to be inserted into.

The central spreader 24 preferably includes a stop 26 (see FIG. 2) and a washer, or the like 28, mounted on the central spreader on one side of the stop. A spring 30 is mounted around the spreader 24 in the central chamber 13 and is held between the washer 28 and bent ends 32 of the three prongs 22.

Figure 3:
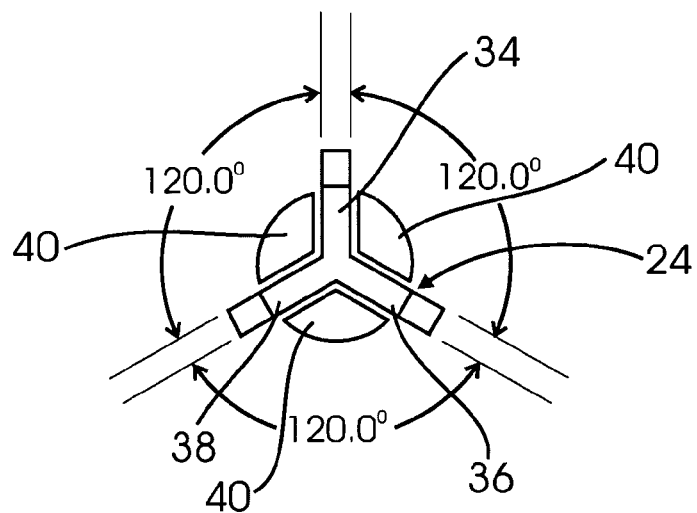
FIG. 3 is an enlarged view of the three prongs and a central spreader of the temporary fastener of FIG. 1.
Figure 4:
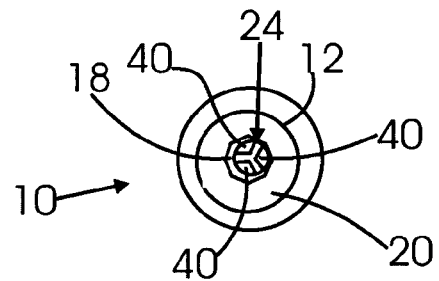
FIG. 4 is a bottom plan view of FIG. 1.
Figure 5:
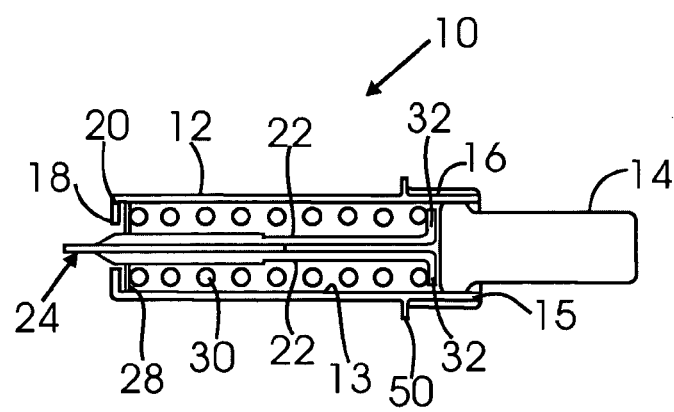
FIG. 5 is a further cross-sectional view of the fastener of FIG. 1.

As is best shown in FIG. 3, the spreader 24 is basically Y-shaped with three evenly spaced arms or portions 34, 36, 38, spread approximately 120° apart, and secured together at inner ends thereof, to more accurately align and guide the prongs 22 during extension and retraction, as explained more fully below. The spaced arms 34, 36, 38 may be formed as one or more pieces and are preferably substantially straight, although they may be curved, as desired, to cooperate with, hold and accurately guide the prongs 22.

As is also shown in FIG. 3, each of the prongs 22 preferably includes an enlarged head, lobe, nose or the like 40, which enlarged head, lobe or nose may be formed in any desired manner and which preferably faces outwardly, away from the spreader 24, to more securely grasp an edge of an opening in a sheet of material when the prongs are bowed or forced outwardly, as explained above. Lower faces, portions or surfaces of the prongs 22, held against the spreader 24 may have reduced or narrowed portions, as explained more fully below.

Figure 6:
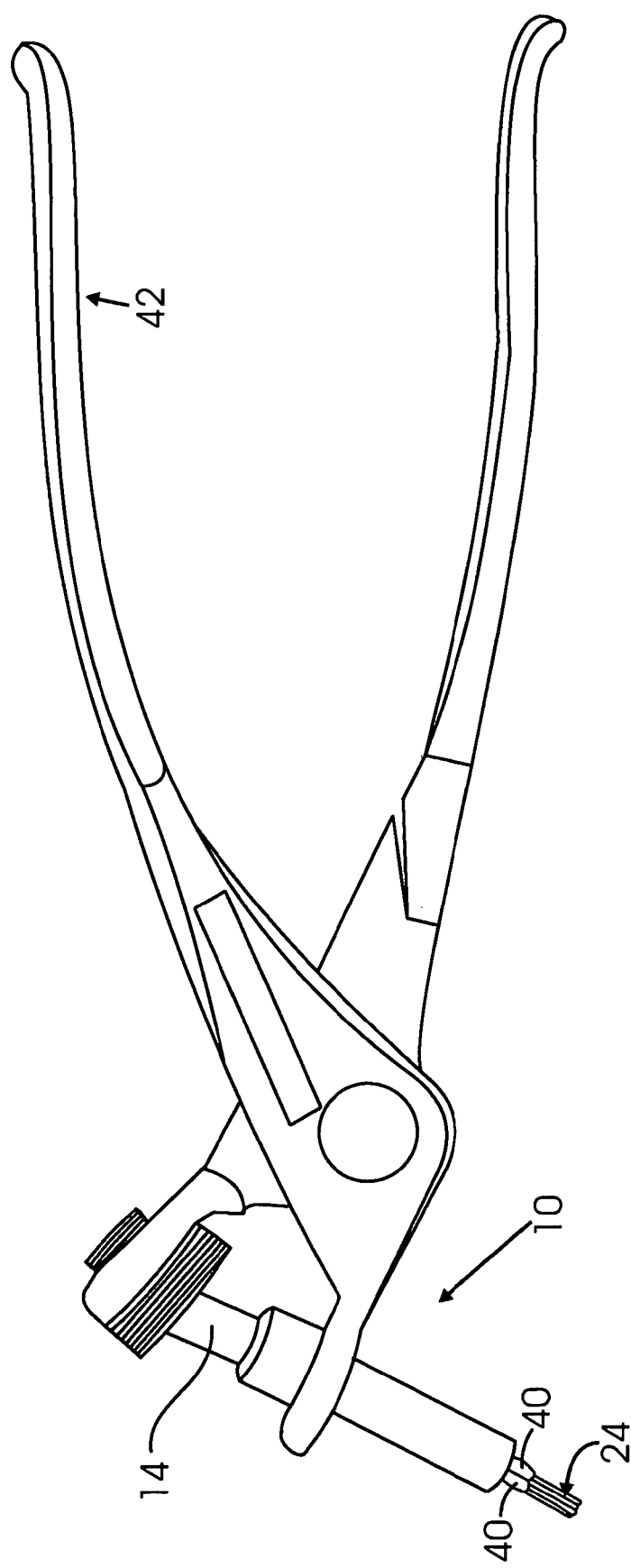
FIG. 6 is a side elevational view showing the temporary fastener of FIG. 1 held in a pair of pliers for operation and insertion into openings.
Figure 7:
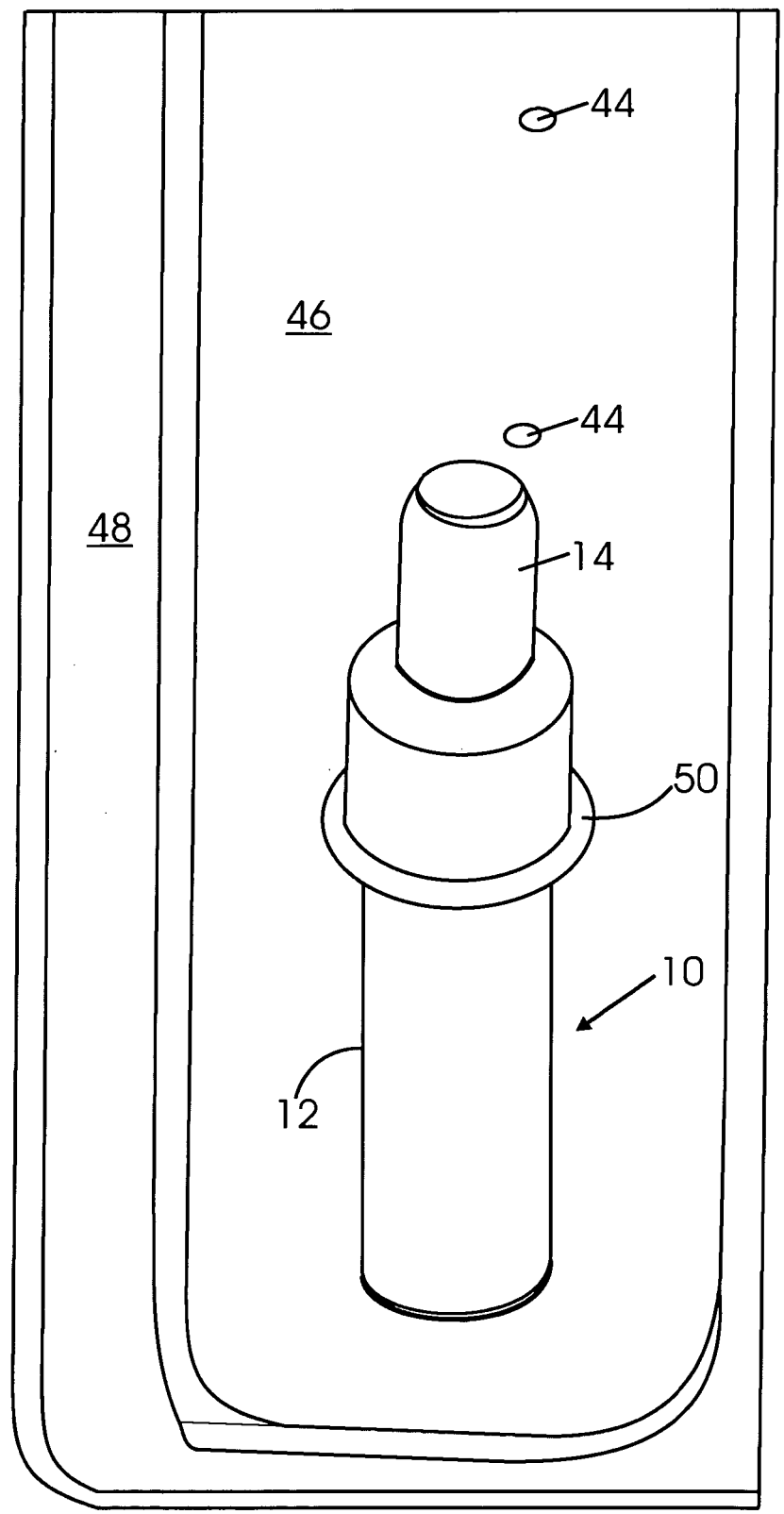
FIG. 7 is a perspective view showing the temporary fastener of FIG. 1 inserted and held in pilot holes in two sheets of material to temporarily secure the sheets of material together.

Turning now to FIG. 6, there shown is a pair of known pliers 42 having a temporary fastener 10 of the invention held therein for insertion into pilot holes or openings, such as 44, formed in two or more sheet of material, such as 46, 48 shown in FIG. 7, to temporarily hold the sheet materials together. The pliers 42 are used to compress the temporary fastener 10 by holding a flange or lip 50 and pushing the plunger 14 into the housing 12 to compress the spring 30 and thereby push the prongs 22 through the opening 18. The prongs 22 move over and are accurately guided between and by the arms 34, 36, 38 of spreader 24. The prongs 22 have sufficient elasticity or spring force, or may include reduced size or narrowed portions, as mentioned above, that rest against or between the arms 34, 36, 38 whereby when the heads 40 of the prongs are extended beyond the outer ends of the spreader 24, the bodies of the prongs will be bowed outwardly while inner faces or portions of the heads of the prongs are brought together to allow the fastener 10 to be inserted in and fill mating holes 44 on two or more sheets of material. The extended and touching heads 40 of the prongs are inserted into the openings such as 44, and the bowed bodies of the prongs, as well as the spreader 24 substantially filling the same until the closed end 20 abuts the sheet material 46 and the heads extend beyond the opposite surface of the sheet material 48. The pliers 42 are then released to decompress the spring 30 and allow the prongs 22 to move back toward the spreader 24 where the bodies are compressed inwardly by the opening 18 and the heads are spread apart so as to contact the sheet 48 and securely hold the temporary fastener 10 in the openings 44. The prongs 22 and spreader 24 act to correct any misalignment of the mating holes 44, while securely holding the sheet materials 46, 48 together. When work is completed on the sheets of material 46, 48, the temporary fastener 10 in the openings may be removed by the pliers 42 for use elsewhere.

Figure 8:
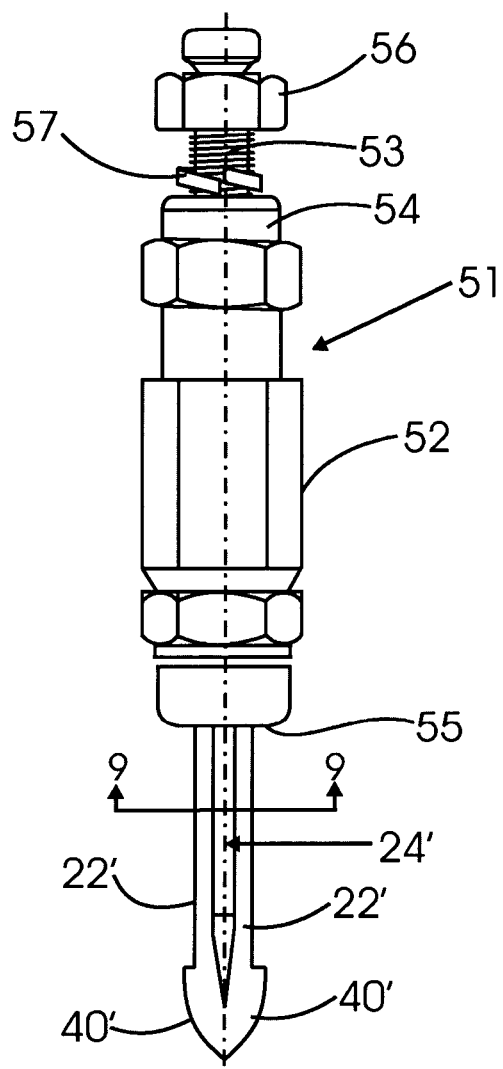
FIG. 8 is a side elevational view of a second embodiment of a temporary fastener of the present invention.
Figure 9:
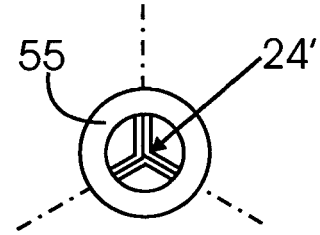
FIG. 9 is a cross-sectional view taken along line 9-9 of FIG. 8.
Figure 10:
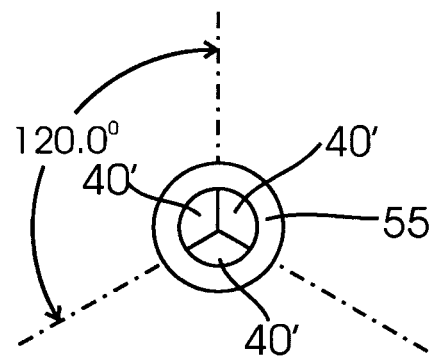
FIG. 10 a partial bottom plan view showing the heads of the prongs and the bottom of the housing of the second embodiment of the temporary fastener of FIG. 8.

A second embodiment of the invention is shown in FIGS. 8-10 at 51. This second embodiment includes a hollow body 52 having an operating element, such as a threaded shaft 53 that is connected to inner ends of three prongs 22', which prongs are substantially similar to prongs 22 and which include enlarged outer ends or heads 40'. The threaded shaft 53 may, for example, be held in an internally threaded collar connected to the inner ends of the prongs 22', or may cooperate with another mechanical connection, such as a rack and pinion, other gearing arrangements, or the like to longitudinally move the prongs 22' toward and away from upper portion 54 and in and out of an opening formed in a lower end 55 of the hollow body 52. The device 51 is inserted into pilot holes or openings such as 44 and an actuator or operator 56, such as a nut, secured on the threaded shaft 53 is tightened or turned to draw or move the threaded shaft. When turned in one direction the nut 56 will draw the prongs 22' into or toward the hollow body 52, whereby the prongs 22' will be expanded or spread apart by a spreader 24', substantially Y-shaped and similar to the spreader 24, at least at its outer end, extending thorough the opening in the lower end 55 of the body 52. The inner end of the spreader 24' may take any desired shape and may be fixed, held or secured in the hollow interior of body 52 in any desired or known manner.

If the nut 56 is fully tightened, for example against end 54 with a lock washer 57 held therebetween, the prongs 22' will be substantially withdrawn into the inner chamber of body 52 with outer ends or heads 40' of the prongs at their maximum diameter, thereby securely holding sheet materials, such as 46, 48, together, in the same manner as discussed above in connection with the first embodiment. The temporary fastener 51 is easily removed by turning or loosening the nut 56 in the other direction, as by use of a manual or powered wrench, if needed, and removing the prongs 22' from the openings.

In addition to acting to more securely hold sheets of material together, the prongs and spreader of the fasteners 10 and 51 substantially fill the mating holes, such as 44, and act to align misaligned mating holes so as to produce more consistent and precise results.

There has been thus described several embodiments of novel and unique temporary attachment or fastening devices for quickly, precisely and easily temporarily securing a number of parts, such as sheet materials together.

Those skilled in the art will appreciate that various adaptations and modifications of the just-described preferred embodiments may be configured without departing from the scope and spirit of the invention. Therefore, it is to be understood that, within the scope of the appended claims, the invention may be practiced other than is specifically described herein.

What is claimed is:

1. A temporary fastener comprising:
   an elongated hollow body having a hollow inner chamber, a lower end, an upper end and an opening defined in the lower end;
   a spreader element disposed at least partially within the hollow inner chamber, the spreader element including three substantially evenly spaced arms each spread approximately 120° apart and connected together at inner ends thereof; and
   three prongs having enlarged heads with lobes, the prongs being slidably held in the elongated hollow body on the spreader element such that each prong lies between a pair of adjacent arms.

2. The temporary fastener of claim 1, further comprising a threaded shaft mechanically connected to inner ends of the three prongs in the hollow inner chamber.

3. The temporary fastener of claim 2 wherein an outer end of the threaded shaft includes an actuator for turning the threaded shaft so as to slidably move the three prongs.

4. The temporary fastener of claim 3, wherein the actuator is a nut.

5. The temporary fastener of claim 4, further comprising a lock washer disposed about the threaded shaft between the nut and the hollow inner chamber.

6. The temporary fastener of claim 1, wherein a portion of the spreader element extends outwardly through the opening defined in the lower end.

7. The temporary fastener of claim 1, wherein the arms are formed as one piece.

8. The temporary fastener of claim 1, wherein the arms are configured to move over and be guided between the arms of the spreader element.

* * * * *